(12) United States Patent
Gong

(10) Patent No.: US 6,324,574 B1
(45) Date of Patent: *Nov. 27, 2001

(54) RELAY SERVER FOR UNSIGNED APPLETS

(75) Inventor: Qing Gong, Boca Raton, FL (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/966,156

(22) Filed: Nov. 7, 1997

(51) Int. Cl.[7] .................................................. G06F 15/16
(52) U.S. Cl. .......................................... 709/218; 709/245
(58) Field of Search .................................... 709/217, 218, 709/219, 245

(56) References Cited

U.S. PATENT DOCUMENTS

| | | | | |
|---|---|---|---|---|
| 5,754,830 | * | 5/1998 | Butts et al. ............................ 395/500 |
| 5,802,298 | * | 9/1998 | Imai et al. ....................... 395/200.47 |
| 5,805,829 | * | 9/1998 | Cohen et al. .................... 395/200.32 |
| 5,822,563 | * | 10/1998 | Sitbon et al. ......................... 395/500 |
| 5,828,840 | * | 10/1998 | Cowan et al. .................. 395/200.33 |
| 5,848,246 | * | 12/1998 | Gish ................................. 395/200.58 |
| 5,848,412 | * | 12/1998 | Rowland et al. . | |
| 5,867,651 | * | 2/1999 | Dan et al. ........................ 395/200.33 |
| 5,870,544 | * | 2/1999 | Curtis . | |
| 5,870,719 | * | 2/1999 | Maritzen ................................. 705/26 |
| 5,884,078 | * | 3/1999 | Faustini ................................. 395/701 |
| 5,899,990 | * | 5/1999 | Marotzen et al. ........................ 707/4 |
| 5,903,901 | * | 5/1999 | Kawakura et al. ................... 707/501 |
| 5,951,652 | * | 9/1999 | Ingrassia, Jr. et al. ............... 709/248 |
| 5,958,051 | * | 9/1999 | Renaud et al. ........................ 713/200 |
| 5,983,348 | * | 11/1999 | Ji . | |
| 5,987,523 | * | 11/1999 | Hind et al. ............................ 709/245 |
| 6,018,724 | * | 1/2000 | Arent . | |
| 6,023,764 | * | 2/2000 | Curtis . | |
| 6,029,000 | * | 2/2000 | Woolsey et al. . | |
| 6,058,482 | * | 5/2000 | Liu . | |
| 6,085,321 | * | 7/2000 | Gibbs . | |

* cited by examiner

*Primary Examiner*—Robert B. Harrell
*Assistant Examiner*—Steve Willett
(74) *Attorney, Agent, or Firm*—Steven J. Meyers; David M. Shofi; Fleit, Kain, Gibbons, Gutman & Bongini P.L.

(57) ABSTRACT

In an information handling system, a relay server provides links for communicating with network resources, via a network comprising a plurality of network units, for client communication units having unsigned Java applets that request a network resource from a target remote server on the network. The request is a signal that identifies the target unit within the network as a source of said network resource. The relay server accomplishes this by establishing a double link between the unsigned applet and the target unit for providing at least the requested network resource.

16 Claims, 3 Drawing Sheets

RELAY SERVER FOR UNSIGNED APPLETS

BACKGROUND OF THE INVENTION

The present invention relates to computers and computer software and more specifically to a relay server for unsigned Java applets.

The Internet is a network of networks linking many computers throughout the world. The World Wide Web (or simply, the Web, for short) is network, within the Internet, linking computers having graphical content and capability for accessing the content. It has revolutionized the communications industry by providing a user-friendly framework for people to view information on a vast variety of subjects. The Web generally comprises a network of computers that include three classes of units. First, there is a class of units called Web content servers that contain the content to be viewed by end users. Second, there are the ISP (Internet Service Provider) units which provide an end user with the communications links required to use the Web. An ISP unit can be a large computer such as a mainframe or one or more smaller units. An ISP server provides connections for its client units via transport addresses or sockets through which communications occur. These sockets allow processes running on separate network units to refer to one another. A socket comprises information identifying a network number, a host number, and a port assigned by the host. Finally, there are the end user units that are the clients (or subscribers) to the ISP server. The Web also comprises a large number of Web sites, each consisting of at least one page of information and usually some graphical features. These Web sites are generally resident in any of the many Web content servers. Users of the Web can access these Web sites by means of any of several information-handling apparatus (such as a personal computer or microcomputer) having communications circuitry enabling a coupling with a public telecommunications network. These users communicate with the Web servers by using a global protocol called the Internet Protocol or IP.

The Web has become immensely popular largely because of the ease of locating information and the user-friendliness of today's browsers. A feature known as hypertext allows a user to access information from one Web page to another by simply pointing (using a pointing device such as a mouse) at the hypertext and clicking. Another feature that makes the Web attractive is having the ability to process the information (or content) in remote Web pages without the requirement of having a specialized applications program for each kind of content accessed. Thus, the same content is viewed across different platforms. Browser technology has evolved to enable running of applications that manipulate this content across different hardware and software platforms. This feature has been made possible by technology such as Java, which is a programming language developed at Sun Microsystems useful for creating generally small application programs that reside in Web sites accessed by users. These applications programs are called applets or Java applets. By downloading Java applets, a user can access features in Web sites that would not be supported by the user's unit without the applet. Thus, applets provide Web users the ability to use a greater variety of Web resources.

When an applet developer creates an applet, there is an opportunity for that developer to "sign" the applet to identify him or her as its source. However, in many cases, applet developers choose not to sign the applets. Such applets are called "unsigned" applets. There are many unsigned applets on the Web. The formats for signing an applet are different for the two main browsers (Microsoft Internet Explorer and Netscape.) Therefore, developers either have to sign an applet in two different ways or only support one browser. For security reasons, unsigned Java applets downloaded from a Web server can only make socket connections back to the Web server, and not to other machines. Therefore, if a user downloads an unsigned applet and the applet requests network services or resources not present within the ISP server (e.g., communication with a chat group or database), the services will be refused by the network (actually, the Web browser acting as part of the network refuses the resource request). Thus, there is a need for a mechanism by which Web users can get around this network restriction.

SUMMARY OF THE INVENTION

Briefly, in accordance with the invention, the above problem is solved by employing a relay server in the network server for connecting to the downloaded unsigned applet and providing a communication link with a target unit in the telecommunications network, to enable the network server to obtain network resources requested by the downloaded unsigned applet. A network resource includes any data or instructions, possibly including multimedia content located in a unit connected to the network.

BRIEF DESCRIPTION OF THE DRAWING(S)

DESCRIPTION OF THE ILLUSTRATIVE EMBODIMENT(S)

Figure 1:
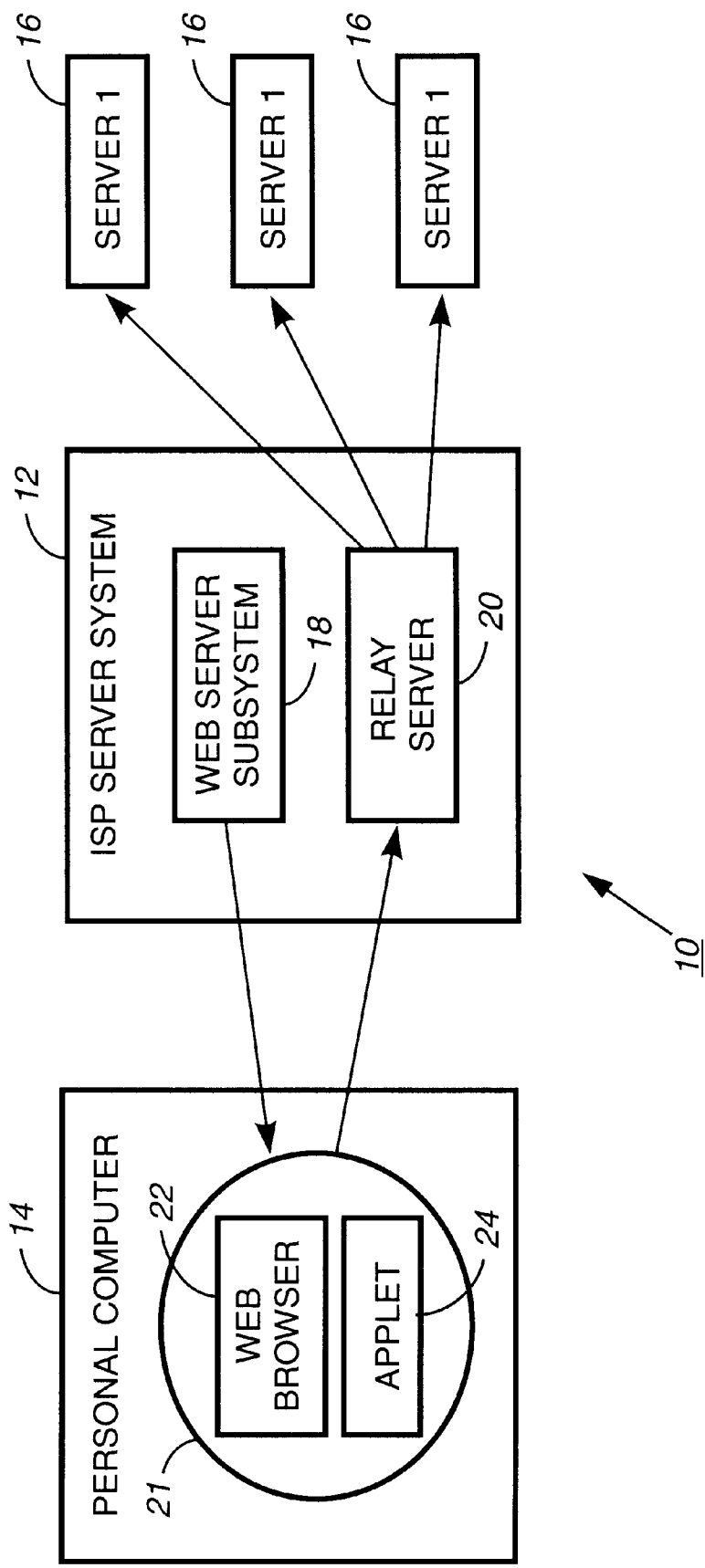
FIG. 1 is a block diagram of a computer system network including a relay server in accordance with the invention.

Referring to FIG. 1, there is shown a block diagram of a computer system network 10 including a relay server 20 in accordance with the invention. The system 10 comprises an ISP-operated server 12, a personal computer 14, and remote servers 16. The ISP server 12 is a computer hardware platform such as an IBM RISC 6000, Intel-based PC, or mainframe running Windows NT, OS/2, AIX or other operating system suitable for network operation. In this embodiment, the ISP server 12 comprises a Web server communication subsystem 18 and a relay server 20 in accordance with the invention. The server subsystem 18 includes the communication circuitry and software required to provide Web users access to the Web.

The personal computer 14 is an end user unit comprising a memory subsystem 21 which in turn comprises Web browser software (e.g., Netscape, Lynx, or Microsoft Internet Explorer) with a socket connection to Web server subsystem 18 of the ISP server system 12, and an applet 24 that have been downloaded from a Web site (e.g., one of the content servers 16). Other components of personal computer 14 are conventional elements that have been omitted because their inclusion would not contribute to the description of this embodiment of the invention.

As discussed above, there are situations where a Web user using the PC 14 downloads unsigned applets (e.g., an unsigned Java applet 24) to his or her browser 22 while browsing the Web. Such applets are deemed untrusted by some. However, as stated above, an unsigned applet 24 may encounter some problems because the browser 22 will not allow it to perform certain functions such as reading from or writing to the host system's memory subsystem 21 or performing networking functions. In this case, the applet 24 requests certain networking services (e.g., interacting with a chat group) that would be denied by the system. The applet 24 enables the user to use Internet services in a Web site at any of the plurality of Web servers via the ISP Web server 12. The solution is to use the relay server 20 to channel these requests to other units (or machines) in the network. Thus, the applet 24 makes a socket connection back to the relay server 20 which resides on the same machine 12 as the Web server 18. The socket connection can be dynamically allocated upon downloading of the unsigned Java applet 24. Dynamic allocation can be accomplished by passing available socket connections or available ports with the applet 24. The applet 24 provides the relay server 20 with information identifying the remote server 16 to which it needs to connect. After connected with the remote Web server 16, the relay server 20 acts as two stream pipes that link data between the applet 24 and the remote Web server 16. Therefore, the relay server 20 acts as a gateway, making a connection with the specified remote server 16 and piping information between the applet 24 and the remote server 16.

The relay server 20 is preferably a standalone application program that can be loaded onto the ISP server's mass storage (shown as element 36 in FIG. 2) and can connect to any machines in the Internet or in an intranet. The relay server 20 processes the requests from the applet and upon request, con any remote server. The relay server 20 is not necessarily subject to the restrictions on unsigned applets.

The relay server 20 can further include the capability to reject or limit the usage of applets on the Web server 12 from the specified hosts. The relay server 20 can also include means for ident (identification) support, for monitoring user data flow, and for maintaining a relay log.

The relay server 20 can be used as a gateway for any other network servers, especially for unsigned Java applets that need to make connections to hosts (e.g., remote servers) other than the Web server that the Java applets are downloaded from and for servers that do not have client control mechanisms. The relay server 20 has two modes: batch and individual. In a batch relay, client software does not need to inform the relay server where it needs to connect. The remote server (16) information is specified at the relay server 20 (this information is editable). The client source code can be modified to add the mechanism (as in the case of an unsigned applet) to specify a remote server 16 for network resources (an individual relay). The relay server 20 can also be used for controlling the domain/hosts that are to be allowed to connect. In addition, the relay server 20 can control how many connections are allowed from a certain domain/host and to provide access control for other non-applet clients, such as a browser.

Figure 2:
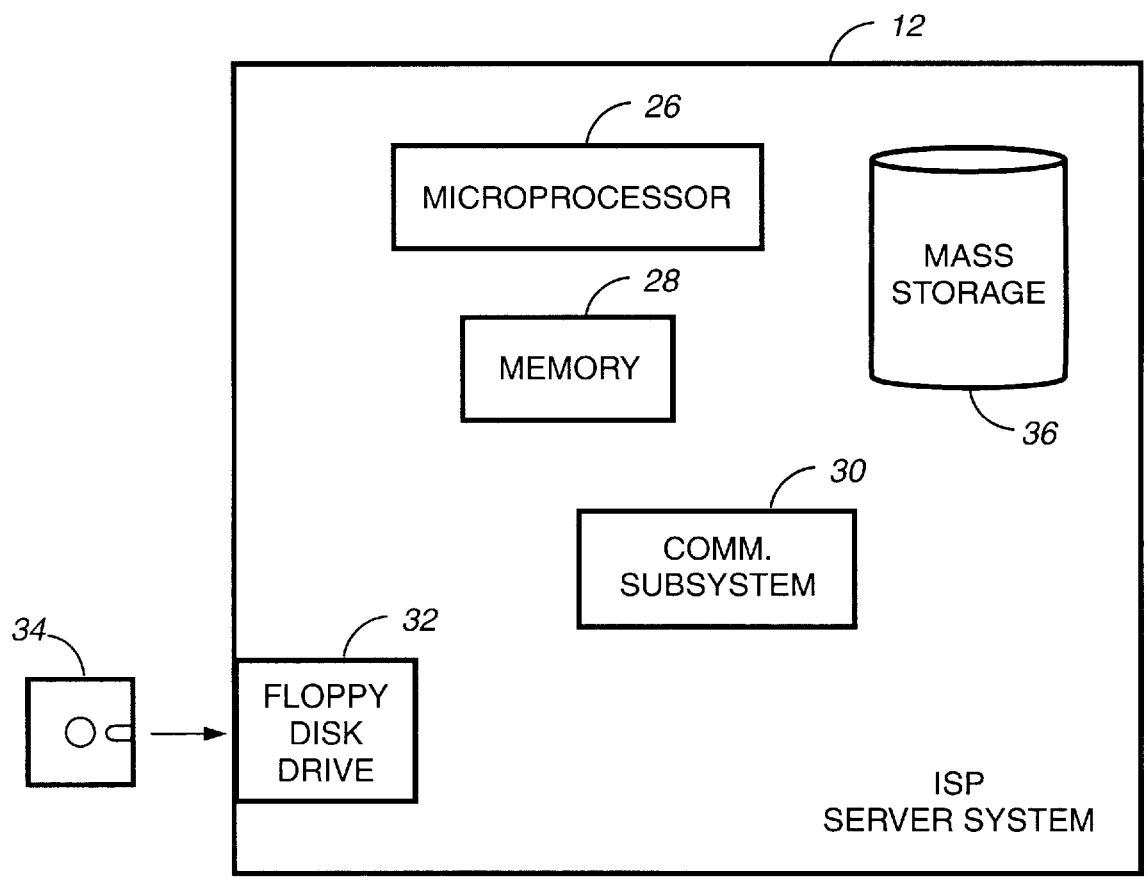
FIG. 2 is a block diagram of the ISP Web server of the network shown in FIG. 1.

Referring to FIG. 2, the ISP server 12 comprises an information processing system comprising a processor unit 26, memory 28, a communication subsystem 30 for linking the information processing system to a telecommunications network, a floppy disk drive 32 for receiving a diskette 34, and mass storage 36 for storing programs, all coupled to each other. The telecommunication subsystem comprises the necessary hardware and software (which may also reside in the mass storage device 36) for establishing links with units coupled to the telecommunications network. The server 12 also comprises the relay server 20 for connecting to information handling units in the telecommunications network (not shown). As mentioned above, the relay server preferably includes an application program (possibly resident in the hard disk drive 36) having instruction code for the processor to process information from unsigned applets resident on at least some of the information handling units, and to connect to a target information handling unit (e.g., a server) specified by a received unsigned applet to provide a communication path linking the target information handling unit with a remote subscriber unit for requesting resources requested by the unsigned applet. However, the relay server 20 can also be implemented as a hard-wired circuit for performing the above functions or as a combination of hardware and software serving the same purpose. In the preferred embodiment the relay server comprises an application program originally recorded on a computer-readable medium such as diskette 34 and loaded into mass storage (hard disk drive) 36 for providing instructions for the processor 26 to cause the system 12 to operate as (among other things) the relay server 20.

Figure 3:
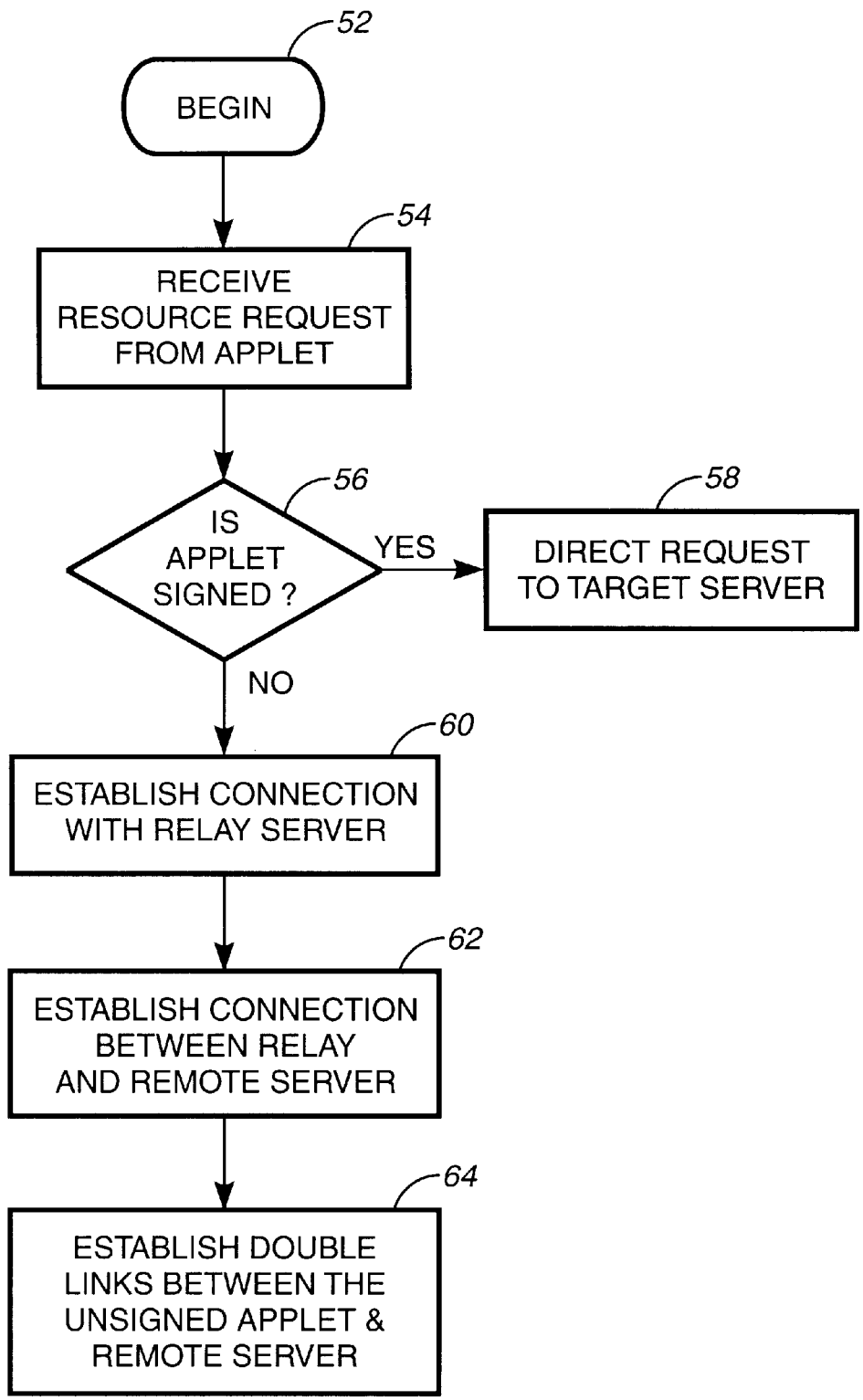
FIG. 3 is a flow chart illustrating a method in accordance with the invention.

Referring to FIG. 3, there is shown a flowchart of a process in accordance with the invention. The process begins at step 52. At step 54, a server unit in the network (e.g., the ISP server 12) receives a request for resource from an applet 24 that has been downloaded by the client unit 14. At step 56 the ISP server 12 determines whether the applet 24 originating the request has been signed. If it is signed, in step 58 the ISP server directly relays the request to the target (remote) server 16 specified by the request message. If the applet is unsigned, in step 60 a communication link is established with a port of the relay server 20. Then in step 62 the relay server 20 establishes a connection between the relay server 20 and the remote server 16. Then in step 64 the relay server 20 establishes double links between the unsigned applet 24 and the remote server 16.

The foregoing is merely illustrative of the principles of the invention. Those skilled in the art will be able to depart from the disclosed embodiment and device alternate embodiments, nevertheless embodying the principles of the claimed invention.

What is claimed is:

1. A communications server for communicating with network resources, via a network comprising a plurality of network units, the communications server comprising:

a web server with a network address and one or more available ports, wherein the web server distributes one or more unsigned applets along with a list of the one or more available ports to the plurality of network units, where at least one unsigned applet requests a network resource not present within the web server from which the unsigned applet was downloaded from;

a relay server having an identical network address as the web server and the relay server capabable of accessing at least one of the one or more available ports on the web server, the relay server comprising:

means for receiving a request for a network resource from an unsigned applet downloaded by a network unit from the web server, the request identifying the identical network address of the web server within the network as a source of the network resource; and means for linking between the unsigned applet and the network resource via the relay server for providing at least the requested network resource dynamically through at least one of the available ports accessible to the relay server which is independent of any restriction settings on the network units themselves.

2. The relay server of claim 1 wherein the unsigned applet is an unsigned Java applet.

3. The relay server of claim 1 further comprising means for controlling access to limit the number of connections to be made to a predetermined domain/host.

4. The relay server of claim 1 further comprising means for maintaining a log of users using the relay server during a specified time.

5. The relay server of claim 1 further comprising means for limiting the usage of applets to a predetermined set of networking functions including reading, writing and editing in the network resource requested by the applet.

6. An information processing system comprising:
   a processor unit;
   a communication subsystem, coupled to the processor unit, for linking the information processing system to a telecommunications network, the subsystem comprising means for establishing links among communication units in the telecommunications network, the communication subsystem having a network address and one or more available ports for distributing unsigned applets along with a list of the one or more available ports among the communications units;
   a relay server having an identical network address as the communication subsystem and the relay server capabable of accessing at least one of the one or more available ports on the web server, the relay server comprising:
      means for receiving a request for a network resource from an unsigned applet downloaded from the communication subsystem by a communication unit in the network, the request identifying the identical network address of the communication subsystem within the network as a source of the network resource; and
      means for dynamically linking between the unsigned applet and the communication subsystem target unit via the relay server for providing at least the requested network resource means for linking between the unsigned applet and the target unit via the relay server for providing at least the requested network resource through at least one of the available ports accessible to the relay server and which is independent of any restriction settings on the communications unit itself.

7. The information processing system of claim 6 wherein the relay server comprises an application program comprising instructions accomplishing said means for receiving a request and said means for linking.

8. At a server unit in a network with a network address and one or more available ports comprising a plurality of communication units, a method for establishing a communication link between a first unit and a second unit, comprising the server unit steps of:
   receiving a request for a resource from the first unit;
   determining whether the request originated from an unsigned applet downloaded to the first unit, wherein the unsigned applet contains a list of the one or more available ports distributed therewith;
   establishing a dynamic communication link with a relay server having an identical network address as the server unit when the request originated from an unsigned applet downloaded to the first unit and the relay server capabable of accessing at least one of the one or more available ports on the web server; and
   requesting, via the relay server, the requested resource from the second unit through at least one of the available ports accessible to the relay server and which is independent of any restriction settings on the first unit itself.

9. The method of claim 8 further comprising the step of establishing a communication link between the relay server and the second unit.

10. The method of claim 8 further comprising the step of establishing a communication link between the unsigned applet and the second unit.

11. The method of claim 10 wherein the communication link is a double link.

12. The method of claim 8 further comprising the step of, preceding the second step, receiving an indication that the second unit is a source for the requested resource.

13. A computer-readable medium of programming instructions for a communications server for communicating with network resources, via a network comprising a plurality of network units, the communications server comprising a web server with a network address and one or more available ports for distributing unsigned applets to the plurality of network units along with a list of the one or more available ports, and the communications server comprising a relay server having an identical network address as the communications subsystem and the relay server capabable of accessing at least one of the one or more available ports on the web server, the programming instructions comprising:
   means for receiving a request for a network resource from an unsigned applet downloaded by a network unit from the web server, the request identifying the identical network address of web server within the network as a source of the network resource wherein the unsigned applet contains a list of the one or more available ports accessible to the relay server; and
   means for dynamically linking between the unsigned applet and the target unit via the relay server for providing at least the requested network resource through the relay server based upon the one or more available ports which is independent of any restriction settings on the network units themselves.

14. A server for the World-Wide Web comprising:
   a processor unit;
   a communication subsystem coupled to the processor unit, for linking the information processing system to the World-Wide Web and for providing links among communication units on the World-Wide Web the communication subsystem having a network address and one or more available ports for distributing unsigned applets along with a list of the one or more available ports among communications units;
   a relay server having an identical network address as the communication subsystem for communicating with network resources, via a network comprising a plurality of network units, the relay server comprising:
      means for receiving a request for a network resource from an unsigned applet downloaded from the communication subsystem by a network unit, the request identifying the identical network address of the communication subsystem within the network as a source of the network resource; and
      means for dynamically linking between the unsigned applet and the target unit via the relay server for providing at least the requested network resource through the relay server based upon the one or more available ports and which is independent of any restriction settings on the network unit itself.

15. The server of claim 14 wherein the relay server comprises an application program comprising instructions accomplishing said means for receiving a request and said means for linking.

16. The server of claim 14 further comprising mass information storage; and the relay server comprises an application program resident in said mass information storage.

* * * * *